Patented May 20, 1930

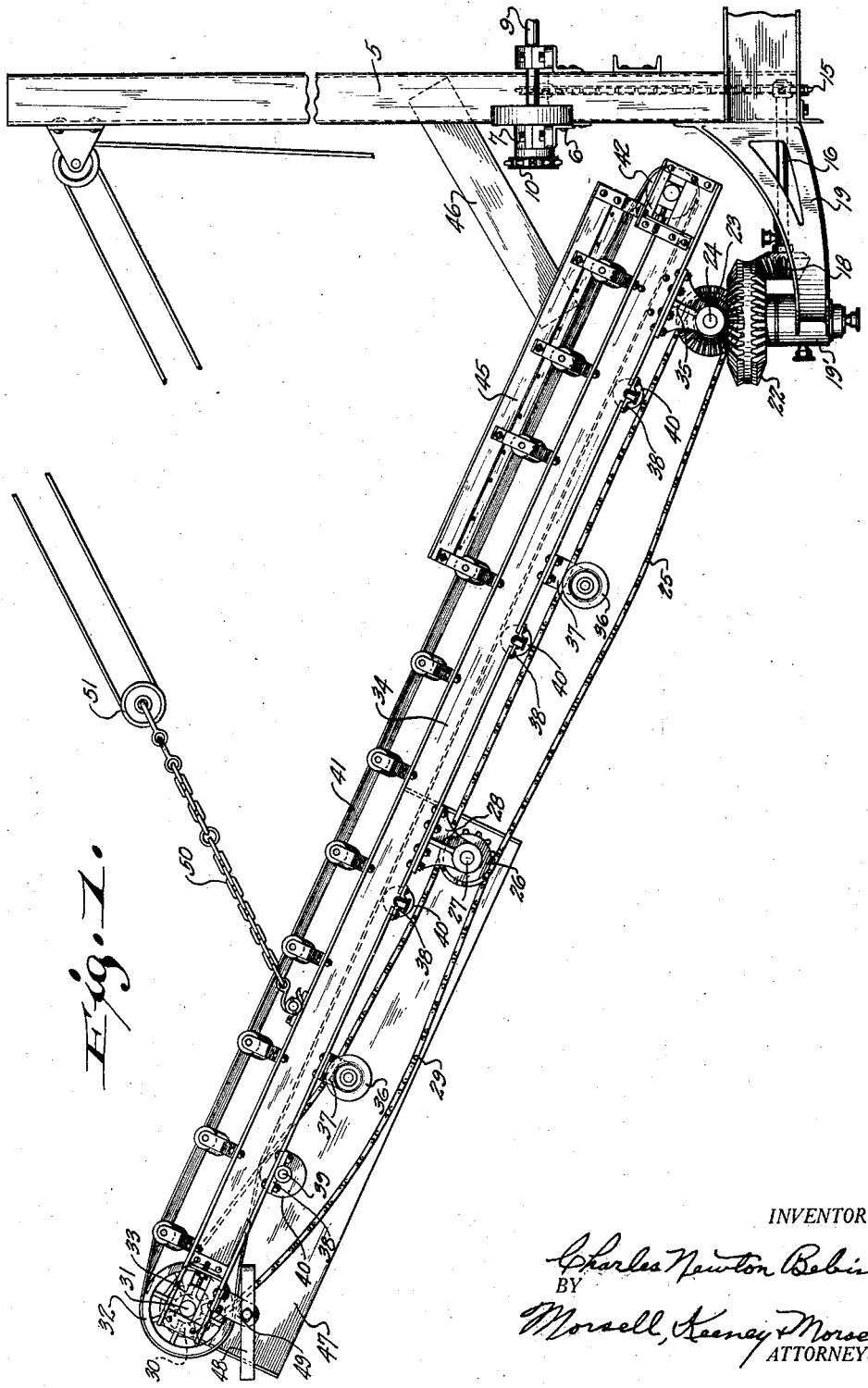

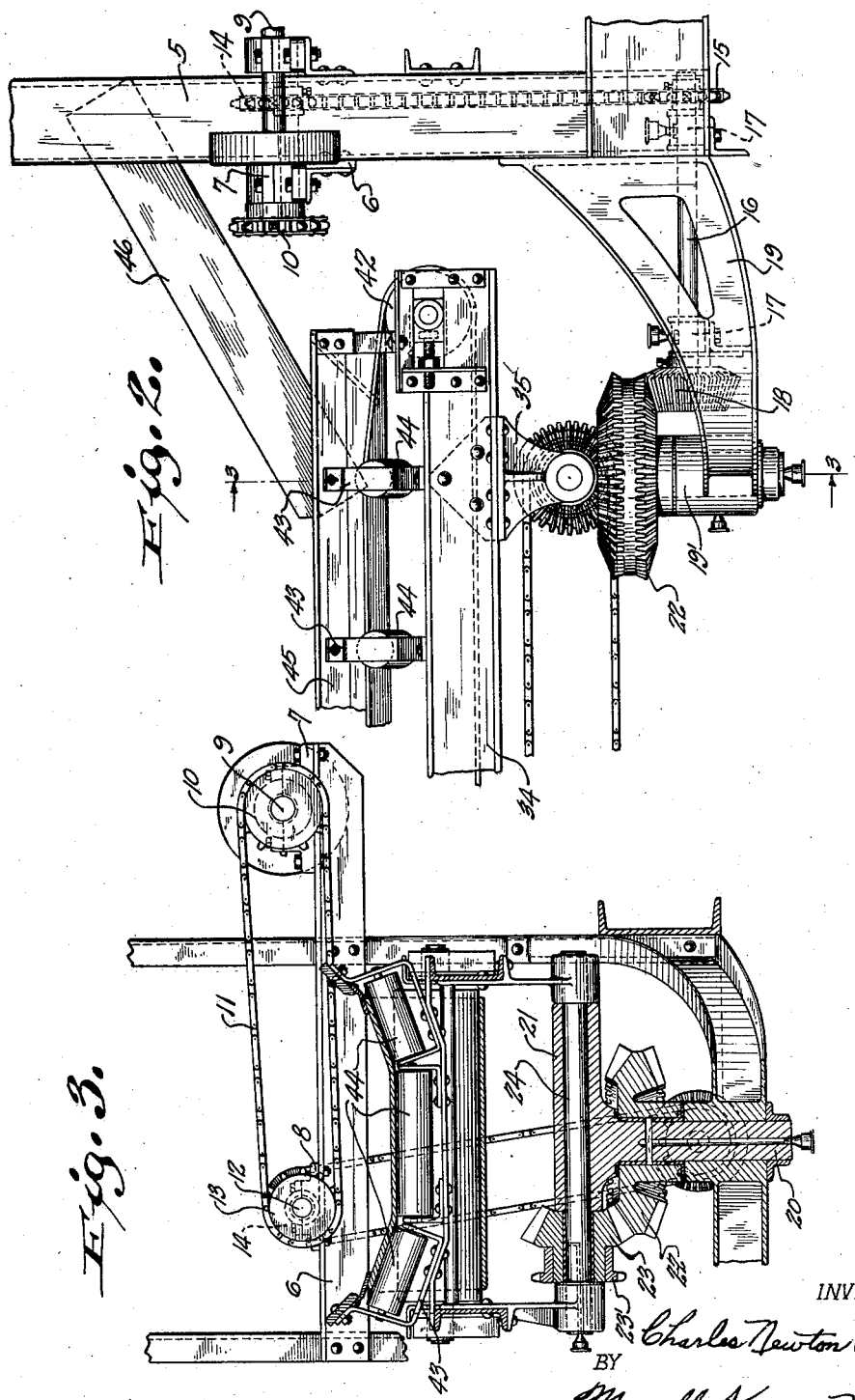

1,759,085

UNITED STATES PATENT OFFICE

CHARLES NEWTON BEBINGER, OF JANESVILLE, WISCONSIN, ASSIGNOR TO NORTHERN CONVEYOR & MFG. CO., OF JANESVILLE, WISCONSIN, A CORPORATION OF WISCONSIN

CONVEYER

Application filed October 14, 1927. Serial No. 226,169.

This invention relates to improvements in conveyers.

Heretofore, in constructing streets, concrete has been discharged by a mixing machine into a wheelbarrow, and by this means conveyed to the portion of the street where it was to be spread. This method not only necessitated the employment of additional laborers, but also consumed considerable time.

It is one of the objects of the present invention to provide an improved conveyer for transmitting material from the concrete mixer to the desired portion of the street.

It is a further object of this invention to provide an improved conveyer which may be swung laterally or vertically without interfering with the operation of the conveyer belt.

It is a further object of this invention to provide an improved conveyer which may be used in attachment with a concrete mixer and which may be operated by power transmitted from said mixer.

It is a further object of this invention to provide a conveyer having an improved means for transmitting power which will permit lateral and vertical adjustment of the conveyer while said power is being transmitted.

It is a further object of this invention to provide a conveyer which is simple in construction, is strong and durable, and is well adapted for the purpose described.

With the above and other objects in view, the invention consists in the improved conveyer and all its parts and combinations as set forth in the claims and all equivalents thereof.

In the accompanying drawings in which the same reference numerals designate the same parts in all of the views:

Fig. 1 is a side elevation of the improved conveyer in attachment with a concrete mixer, parts being broken away;

Fig. 2 is an enlarged view of a portion of the device showing the driving means in detail, parts being broken away; and Fig. 3 is a sectional view taken on line 3—3 of Fig. 2.

Referring to the drawings, the numeral 5 designates a portion of a concrete mixer, having a transverse flanged bar 6 on which an outer bearing 7 and an inner bearing 8 are mounted. Journaled in said outer bearing is a shaft 9, rigidly mounted on which is an outer sprocket wheel 10. Connected to the outer sprocket wheel by an endless chain 11 and rigidly mounted on a shaft 12 in the inner bearing, is a sprocket wheel 13. Inwardly from the sprocket wheel 13, on the shaft 12, is a sprocket wheel 14 connected by an endless chain to a lower sprocket wheel 15. The latter is rigidly mounted on a shaft 16 which is journaled in bearings 17. On the outer end of the shaft 17 is a bevel pinion 18. A bracket 19 extending from the concrete mixer has a bearing 19' formed on its outer end. In the bearing 19, a shaft 20 extending from a bearing 21, is journaled, to form a swivel for the conveyer.

Loosely mounted on the upper portion of the shaft 20 is an intermediate double bevel gear 22, its lower bevel meshing with the pinion 18 and its upper bevel meshing with a pinion 23. The pinion 23 is loosely mounted on a shaft 24 which is journaled in the bearing 21. Keyed to the pinion 23 is a sprocket wheel 23' which is connected by an endless chain 25 to an intermediate sprocket wheel 26 rigidly mounted on a shaft 27 in the bearing 28. An inner sprocket wheel rigidly mounted on the shaft 27 behind the sprocket wheel 26 is connected by an endless chain 29 to a sprocket wheel 30. The latter is rigidly mounted on a shaft 31 on which, also rigidly mounted, is a conveyer belt wheel 32. The shaft 31 is journaled in bearings 33 at the outer end of the conveyer.

Side members 34 of the conveyer are provided near their inner ends with bearing brackets 35 which pivot on the shaft 21. Chain guides 36 in the form of pulleys are secured to the under side of the side members by brackets 37. Journaled in bearings 38 are shafts 39 on which are rollers 40 engaging the under side of the endless conveyer belt 41. The conveyer belt travels between the wheel 32 and an inner roller 42. A series of concavely mounted bearings 43 carry rollers 44 upon which the upper part of the conveyer belt 41 travels. Protecting sides 45 at the inner end of the conveyer prevent the concrete from splashing out of the conveyer when it is being discharged by the spout 46 of the concrete mixer. Downwardly extending guard members 47 are provided at the outer end of the conveyer. A belt tightener 48 held between brackets 49 maintains the conveyer belt at any desired tension. The conveyer is held in a raised position by means of a chain 50 attached to a pulley 51. The pulley is arranged to be connected to the concrete mixer.

The operation of the device is as follows: Power is transmitted by the sprocket wheel 10 and the endless chain 11 to the sprocket wheel 13 which causes the shaft 12 to revolve. The sprocket wheel 14 then transmits power to the sprocket wheel 15 and the shaft 16 is caused to revolve and with it the pinion 18. The pinion 18, through the intermediate bevel gear 22, imparts rotation to the pinion 23 and the sprocket wheel 24. By means of the endless chains 25 and 29, the sprocket wheel 30 and the belt wheel 32 are set in motion which causes the conveyer belt to travel over the rollers. Material which is discharged by the concrete mixer through the chute 46 is carried by the belt to the end of the conveyer and there it is discharged into the street or wherever desired. The conveyer may be pivoted on the shaft 21 to any desired height without interfering with the driving mechanism. The conveyer may also be swung laterally, the shaft 20 swivelling in the bearing 19' without interfering with the operation of the gears. By use of this conveyer, mixed concrete may readily be distributed over a wide area of street in a very short time.

From the foregoing description, it may be seen that the improved conveyer is simple in construction, is strong and durable, and is well adapted for the purpose described.

What I claim as my invention is:

1. The combination with a conveyer having an endless belt, of a supporting means therefor, comprising bearings extending from a portion of the conveyer, a bearing on said supporting means, a vertical shaft in said bearing having its upper end formed with a horizontally disposed bearing, an intermediate gear loosely mounted on said vertical shaft, a horizontal shaft journaled in the horizontal bearing and in the bearings extending from the conveyer, a pinion loosely mounted on said shaft and engaging the intermediate gear, means on said pinion for transmitting motion from the pinion to the endless belt, and a pinion on the supporting means engaging the intermediate gear, and means for driving the pinion.

2. The combination with a conveyer having an endless belt, of a supporting means therefor, comprising a sprocket drive wheel for the endless belt, bearings extending from a portion of the conveyer, a bearing on the supporting means, a vertical shaft in said bearing having its upper end formed with a horizontally disposed bearing, a double bevel gear loosely mounted on said vertical shaft, a horizontal shaft journaled in the horizontal bearing and in the bearings extending from the conveyer, a pinion loosely mounted on the horizontal shaft and engaging the upper bevel of the double bevel gear, a sprocket wheel driven by said pinion, endless chains for transmitting motion from said sprocket wheel to the sprocket drive wheel for the endless belt, and a pinion on the supporting means engaging the lower bevel of the double bevel gear and in connection with an outside source of power.

In testimony whereof, I affix my signature.

CHARLES NEWTON BEBINGER.